United States Patent Office 2,769,509
Patented Nov. 6, 1956

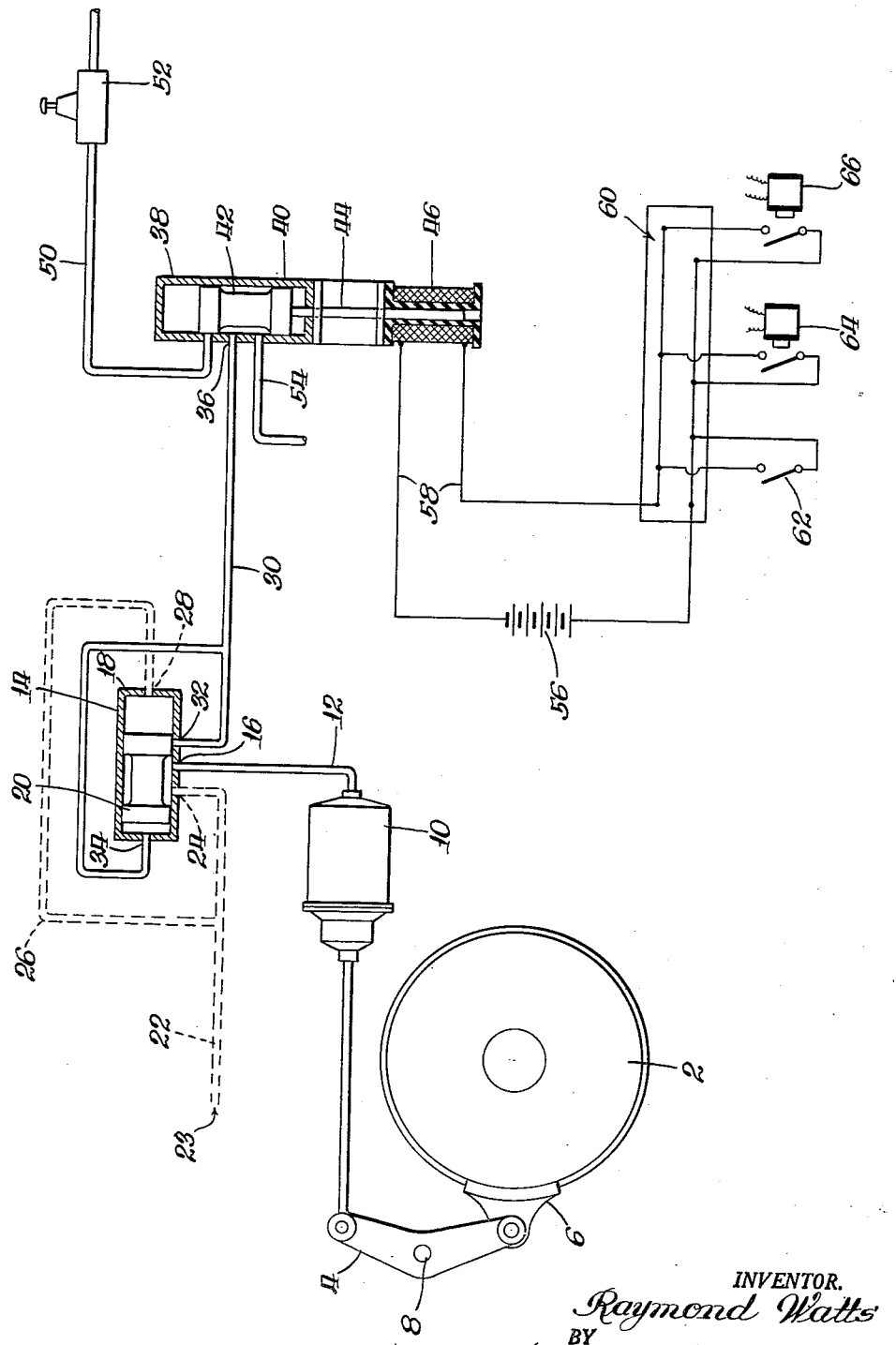

2,769,509

ANTI WHEEL SLIP DEVICE

Raymond Watts, Chicago, Ill., assignor to American Steel Foundries, Chicago, Ill., a corporation of New Jersey Application October 30, 1953, Serial No. 389,193

6 Claims. (Cl. 188—1)

The invention relates to a control arrangement to be utilized on a locomotive or other railed vehicle to increase the effective traction thereof.

The railway art has long been aware that adhesion between the locomotive wheel and the rail is the primary limiting factor controlling the effectiveness of locomotive operation. In the case of acceleration of the vehicle the adhesion problem manifests itself in wheel slip which obviously causes a loss of power, potential damage to the track and wheel, and is also believed to be the cause of many other troubles or difficulties associated with tractive equipment. In the case of deceleration, that is, dynamic braking of the locomotive or other vehicle, the adhesion problem manifests itself by wheel sliding which obviously reduces the effectiveness of any braking action as well as by a source of potential damage to the track and wheel. In its simplest terms the solution of the problem requires an increase of adhesion between the track and wheel during both acceleration and deceleration.

It has been discovered that the presence of dirt and/or moisture on the track and wheel results in a pronounced decrease of adhesion with the consequent unfavorable results. Of course, these external conditions of dirt and moisture are uncontrollable. It has further been discovered that the action of a brake shoe on the tread of a wheel such as that employed in conventional clasp brake arrangements, increases the adhesion between the wheel and track especially when the heretofore mentioned unfavorable external conditions of dirt and moisture are present. This improved action appears to result from a cleansing and conditioning action of the brake shoe on the wheel tread during engagement therebetween, although it is possible that other factors may contribute to the favorable result.

Accordingly, it is a primary object of the invention to provide means for light pressured application of a brake shoe against the locomotive wheel tread during either vehicle acceleration or deceleration.

It is a further object of the invention to provide an automatic control for said light shoe application responsive to devices which sense both wheel slipping and wheel sliding.

It is an additional object of the invention to provide a manual control for said light shoe application.

These and other objects of the invention will become apparent from an examination of the specification and the attached drawing, which diagrammatically indicates a preferred arrangement of the control circuit employed in the invention.

Describing the invention in detail, a wheel of the railed vehicle is indicated at 2. A conventional brake lever 4 carries a brake shoe 6 on the lower end thereof, said brake shoe being engageable with the peripheral tread of the wheel 2 upon pivotal action of the lever 4 about the point 8, said pivotal action being induced by the operatively connected brake cylinder 10. The brake cylinder 10 is actuable by any suitable pressure fluid being induced therein via the conduit 12. As is well understood in the art, in conventional brake cylinder arrangements the actuating pressure fluid employed is high pressure air.

The conduit 12 is connected directly to a two way pressure actuating valve 14 as at 16, said valve comprising a cylinder 18 with a longitudinally movable piston 20 disposed therein. A relatively high pressure brake line indicated in dotted lines at 22 may also be connected to the valve 14 as at 24, said high pressure line 22 having another connection 26 to one side of the movable piston 20 as at 28. A relatively low pressure fluid line 30 is connected to the valve as at 32, said low pressure line 30 having another connection as at 34 to the side opposite the mentioned side of the movable piston 20. The high pressure line 22 is connected at 23 to a conventional relay or valve (not shown) which controls the admission of high pressure fluid to the line 22 in the usual manner. The low pressure line 30 is directly connected as at 36 to a two way electrically operated valve 38, said valve 38 comprising a cylinder 40 having a piston 42 movable therein. The piston 42 is connected as at 44 to a solenoid 46, said solenoid being operative to move the piston 42 to either of two positions as will be more fully hereinafter explained.

A line 50 is provided which connects the valve 38 with a pressure source (not shown), said line 50 having an adjustable pressure regulator 52 therein to control the intensity of the pressure fluid which will be admitted to the valve 38. Additionally, the valve 38 is provided with a port or vent 54 which communicates with the atmosphere.

An electrical power source such as the battery 56 is provided having a power line 58 connected to the solenoid 46. The line 58 is connected to a multiple buss 60, said buss providing parallel switch arrangements to control the closing of the circuit 58 to the solenoid 46. A manual control switch 62 is provided in any convenient location in the engineer's cab of the locomotive to close the circuit through the solenoid 46. Additionally, another control closing switch or relay 64 is provided to close the circuit through the solenoid 46. The relay 64 is conventionally known in the art as a wheel sensing slip relay, said relay being responsive to an arrangement (not shown) which picks up and senses slipping of the wheel 2 during acceleration of the vehicle. Another relay 66 is operatively connected to an arrangement (not shown) associated with the wheel 2 of the vehicle which picks up and senses wheel slide during deceleration of the vehicle under dynamic braking, thus the relay 66 may be denominated as the wheel slide sensing relay.

To further understand the invention it should be noted that the high pressure line 22 has been shown in dotted lines in view of the fact that it may be optionally deleted from the control arrangement. When the particular locomotive or other vehicle employs a clasp or wheel tread braking arrangement, it is desirable to have the high pressure line 22 in the circuit to afford proper pressure to utilize the brake shoe 6 as a primary braking member for the vehicle. In this arrangement it would be unnecessary to incorporate the wheel slide sensing relay 66 and any control arrangement associated therewith. However, if the primary braking for the vehicle is supplied by braking arrangement other than that applied to the tread of the wheel, for example, an off-wheel rotor brake, then it becomes desirable to employ the relay 66 to obtain proper control of the brake shoe 6 in response to wheel slide during deceleration of the vehicle.

In the operation of the preferred embodiment and upon acceleration of the vehicle, wheel slip is detected by the slip sensing relay 66 which closes the circuit through the solenoid 46, said solenoid urging the piston 42 of the valve 38 upwardly and establishing communication between the low pressure source 50 and the low pressure line 30. Low pressure in the line 30 is conveyed as at 34 to one side of the piston 20 of the valve 14, said pressure being operative to move the piston 20 to the right whereby communication is established between low pressure line 30 and input brake cylinder conduit 12. The preselected low pressure in line 30 is just sufficient to actuate the brake cylinder 10 to urge the brake shoe 6 into relatively light pressured engagement with the tread of the wheel 2. The effect of the light pressured engagement between the shoe 6 and the tread of the wheel 2 is negligible as far as any braking action is concerned but is sufficient to clean and condition the tread of the wheel whereby the adhesion between the wheel 2 and the related track is increased, thus reducing or eliminating the tendency of the wheel 2 to slip. As soon as the slip of the wheel 2 is eliminated the relay 64 opens the circuit to the solenoid 46 whereby the piston 42 is brought into its neutral position and communication between the low pressure line 30 and the atmosphere via the port 54 is established, whereby the shoe 6 is brought out of engagement with the tread of the wheel 2.

When the high pressure line 22 is incorporated in the control arrangement the brake shoe 6 acts as a primary braking member and the cleansing and conditioning action of the shoe on the wheel tread results without the necessity of employing a relay to sense wheel slip. However, when primary vehicle braking action is afforded by some other braking arrangement, such as the heretofore mentioned off-wheel brake, the wheel sensing relay 66 may be incorporated in the circuit. In this latter instant upon dynamic braking of the vehicle the relay 66 picks up any tendency of the wheel 2 to slide on the track. The sliding action of the wheel energizes the relay 66 and closes the circuit through the solenoid 46, whereby the piston 42 is again moved upwardly and communication is established between the low pressure line 50 and the line 30 to the two way pressure actuated valve 14. The action is identical with that described for the slip sensing relay, that is, the brake cylinder 10 is energized and the brake shoe 6 is urged to lightly contact the tread of the wheel 2, whereby the adhesion between the wheel tread and rail is increased due to the cleansing and conditioning action of the shoe 6 on said tread. Upon elimination of the wheel slide the relay 66 is opened returning the solenoid to the original position and the brake shoe disengages the tread of the wheel 2.

I claim:

1. In a railway braking arrangement having means for increasing adhesion between a wheel tread and a rail, a wheel having a tread engageable with the rail, a brake lever having a shoe thereon engageable with the tread of said wheel, a fluid actuated brake cylinder operatively connected to the lever, a conduit carrying actuating fluid to the cylinder, and means in said conduit to control the pressure of said actuating fluid, said means comprising a two way pressure actuated valve connected to said conduit, a pressure actuated piston in the valve, a relatively high pressure line communicating with said valve and with one side of said piston, a relatively low pressure line communicating with the valve and with the other side of said piston, said piston being operative to selectively connect one of said lines with said conduit, a solenoid controlled valve in said low pressure line operative to control the flow of pressure fluid therein, and electrical means to control the action of said solenoid controlled valve.

2. A control arrangement according to claim 1, wherein said electrical means comprises electrical leads to said solenoid valve and control switches to close the circuit thereto.

3. In a railway braking arrangement having means for increasing adhesion between the wheel tread and the rail, a wheel having a peripheral tread engageable with the rail, a pivotally movable brake lever, a brake shoe carried by the lever and engageable with the tread, a fluid operated brake cylinder operatively connected to the lever, a conduit for conducting fluid to the cylinder, said conduit communicating with a two way valve, said valve having a movable piston therein, a relatively high pressure line having connections to the valve and to one side of the piston whereby pressure in said high pressure line will actuate said piston and establish communication between the high pressure line and the conduit for actuation of the brake lever whereby braking engagement between the tread and the shoe occurs, a relatively low pressure line having connections to the valve and to the other side of the piston whereby pressure in said low pressure line will actuate said piston and establish communication between the low pressure line and the conduit for actuation of said cylinder and brake lever for relatively light engagement between the tread and the shoe, and means on said low pressure line to control the flow of pressure fluid therein.

4. An arrangement according to claim 3, wherein said means consists of a multiple position valve having a movable piston and a solenoid connected thereto to move same, a connection between the valve and the low pressure line and a connection between the valve and a source of low pressure fluid, a port in the valve connecting same to the atmosphere, said piston in one position thereof establishing communication between source and said low pressure line and in another position thereof establishing communication between said port and said low pressure line, and electrical means controlling the actuation of the solenoid.

5. An arrangement according to claim 4, wherein said electrical means consists of an electrical line connecting the solenoid to a power supply and a closable switch in said line.

6. In a railway braking arrangement having means for increasing adhesion between the wheel tread and the rail, a wheel having a peripheral tread engageable with the rail, a pivotally movable brake lever, a brake shoe carried by the lever and engageable with the tread, a fluid operated brake cylinder operatively connected to the lever to actuate same, a conduit for conducting fluid to the cylinder, and valve means providing a connectable source of low pressure fluid to the cylinder whereby the brake shoe is urged into relatively light pressured engagement with the tread to aid in adhesion between the wheel and the rail.

References Cited in the file of this patent

UNITED STATES PATENTS

| | | |
|---|---|---|
| 1,919,343 | Payne | July 25, 1933 |
| 2,323,208 | Eaton | June 29, 1943 |